United States Patent
Yuen et al.

(10) Patent No.: US 8,078,031 B2
(45) Date of Patent: *Dec. 13, 2011

(54) VIDEO TAPE INDEXING SYSTEM AND METHOD

(75) Inventors: Henry C. Yuen, Pasadena, CA (US); Wing P. Leung, Arcadia, CA (US)

(73) Assignee: Index Systems, Inc., Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 12/430,630

(22) Filed: Apr. 27, 2009

(65) Prior Publication Data

US 2009/0210906 A1    Aug. 20, 2009

Related U.S. Application Data

(63) Continuation of application No. 10/601,224, filed on Jun. 20, 2003, now Pat. No. 7,542,657, which is a continuation of application No. 09/467,538, filed on Dec. 18, 1999, now Pat. No. 6,608,963.

(60) Provisional application No. 60/112,945, filed on Dec. 18, 1998.

(51) Int. Cl.
*H04N 9/80* (2006.01)
*H04N 5/92* (2006.01)

(52) U.S. Cl. ........ 386/241; 386/247; 386/248; 386/291; 386/297

(58) Field of Classification Search .................. 386/241, 386/247, 248, 291, 297

See application file for complete search history.

(56) References Cited

U.S. PATENT DOCUMENTS

| | | | |
|---|---|---|---|
| 5,253,066 | A | 10/1993 | Vogel |
| 5,260,788 | A | 11/1993 | Takano et al. |
| 5,353,121 | A | 10/1994 | Young et al. |
| 5,361,173 | A | 11/1994 | Ishii et al. |
| 5,390,027 | A | 2/1995 | Henmi et al. |
| 5,541,738 | A | 7/1996 | Mankovitz |
| 5,761,371 | A | 6/1998 | Ohno et al. |
| 5,867,226 | A | 2/1999 | Wehmeyer et al. |
| 5,930,449 | A | 7/1999 | Hwang |
| 6,177,931 | B1 | 1/2001 | Alexander et al. |
| 6,608,963 | B1 | 8/2003 | Yuen et al. |

FOREIGN PATENT DOCUMENTS

| | | |
|---|---|---|
| JP | 06-103641 | 4/1994 |
| JP | 07-021748 | 1/1995 |
| WO | WO-92/22983 | 12/1992 |

*Primary Examiner* — Vincent Boccio

(74) *Attorney, Agent, or Firm* — Ropes & Gray LLP

(57) ABSTRACT

A video tape indexing system in which program broadcast identification information is entered into the system for use in recording the program. When the program is recorded, the system stores indexing information in an index memory. The system monitors a broadcast channel for electronic program guide information that includes titles and usually channel, date, time and length for the titles. The system matches the channel, date, time and length information from the broadcast channel with the identification information entered for the program to be recorded. The title in the broadcast channel associated with the channel, date, time and length information is then associated with the indexing information for the program.

16 Claims, 2 Drawing Sheets

VIDEO TAPE INDEXING SYSTEM AND METHOD

RELATED APPLICATION

This application is a continuation of U.S. patent application Ser. No. 10/601,224, filed on Jun. 20, 2003, which is a continuation of U.S. patent application Ser. No. 09/467,538, filed on Dec. 18, 1999 which claims priority of U.S. provisional Application No. 60/112,945 filed Dec. 18, 1998, the disclosures of which are incorporated fully herein. This application is also related to application Ser. No. 08/777,799, filed on Dec. 31, 1996, the disclosure of which is incorporated fully herein by reference.

BACKGROUND OF THE INVENTION

One of the major cost items in the Index Plus+ system is the memory needed to store the information of the shows, which includes channel, date, time, length and title of a show. This practically requires as much memory as is needed for implementation of an electronic program guide (EPG). Also, the number of days in advance of the program telecast that recordings can be scheduled is limited by memory and data bandwidth.

The invention greatly reduces the memory requirement and hence the cost of implementation. It is primarily intended to be implemented without a locally stored EPG data base.

SUMMARY OF THE INVENTION

The system includes an input that receives indications identifying a television program broadcast, including one or more of channel, start time, end time, date, day of the week and length. It also includes a video system recorder controller that provides commands to one or more of a video recorder and a tuner to record a television program according to one of the input indications, an index memory that stores video tape identification and video tape index information and the identification indication for television programs recorded under control of the video system recorder controller and a data receiver that receives data comprising titles, sets of television broadcast identifiers, each such set including one or more of channel, start time, end time, date, day of the week and length, and associations between a plurality of the titles and a plurality of the sets of television broadcast identifiers. The title from the data receiver is stored in the index memory and associated with the video tape identification and video tape index information and the identification indication associated with the title.

DETAILED DESCRIPTION

Figure 1:
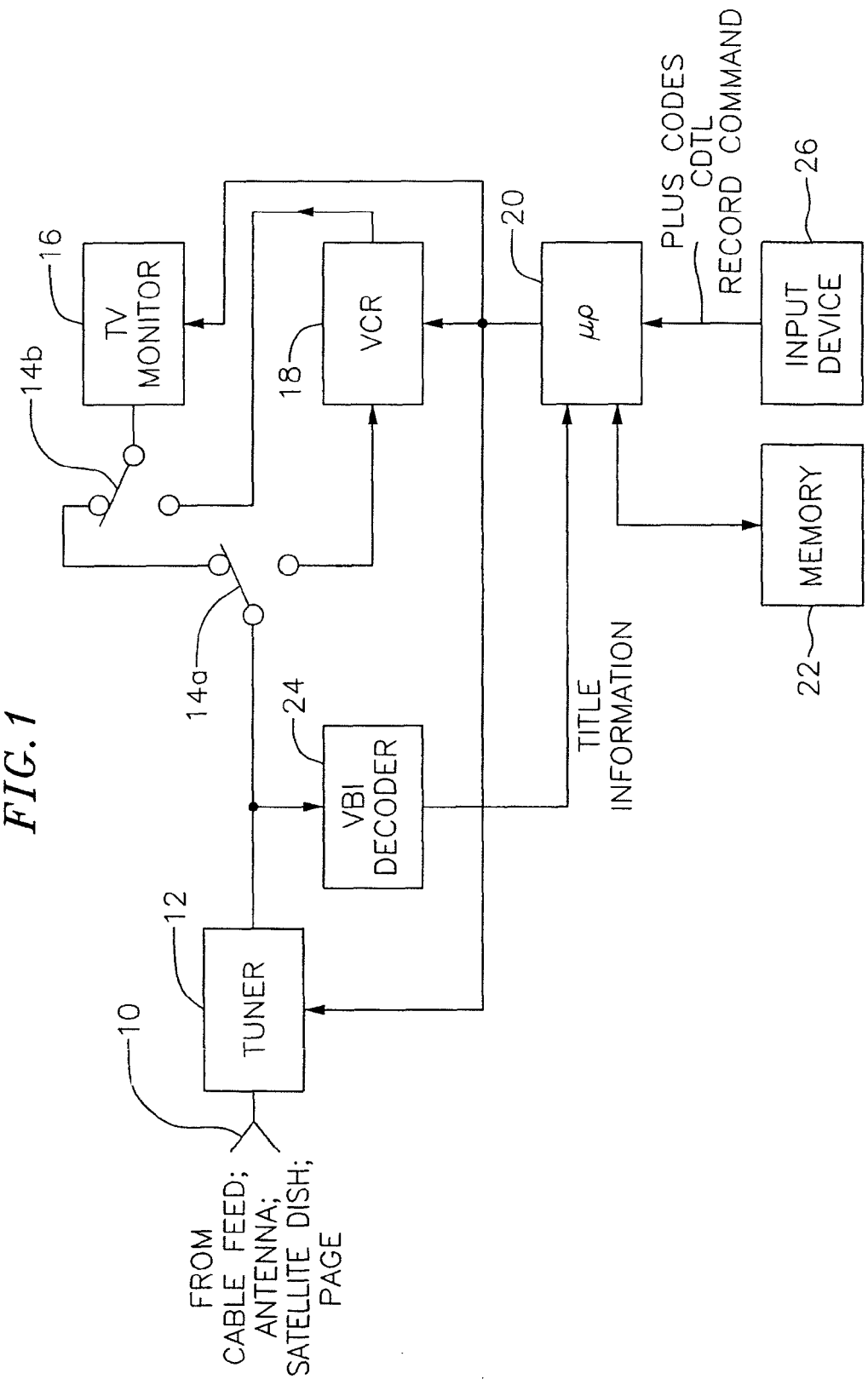
FIG. 1 is a block diagram of a system according to a preferred embodiment of the invention.

The concept is first to accept as an input at a user terminal either through (a) VCR Plus+, (b) direct channel/date/time/length (CDTL) input, or (c) instant, i.e., real time, recording, the CDTL information of the show(s) the user wishes to record. In case (a), the Plus Codes are decoded to produce CDTL information. In case (c), the time that the record command is given is read from a real time clock and the channel to which the tuner is set is read at the time of the record command. (There is usually no length information in this case.) In cases (a) and (b), the CDTL information, is stored in an appropriate memory (either in a RAM in the VCR, on the tape, or on a chip attached to the tape cassette, etc.). In case (c), the channel and time of the record command are stored in the memory. In cases (a) and (b), the time component of the CDTL information is compared with the output of a real time clock; when a match occurs, the tuner is set to the channel represented by the CDTL information and the VCR is turned on to record the show the user has selected. In all cases, the location of the program being recorded on the tape is also stored in the memory with the channel and time information. In all cases, date may be replaced with day of the week and length may be replaced with end time or start time and length can be replaced with end time and length. If the recording is performed on the same day as it is programmed to be recorded even the date or day of the week can be omitted. Also, because recording automatically stops at the end of the tape, the length or end time is not critical to the system's operation either.

On a regular basis, e.g., once a day or every other day, all the program titles (and related data) for a specified time period are transmitted with the television signal, e.g., in the VBI. Alternatively, the data may be sent in a distributed way over a long period of time, e.g., 24 hours. In the latter case, the receiving equipment has to monitor the VBI data over the time of data broadcast (e.g., 24 hours). The channel and time of telecast of each program are included with the program title. The title of a program, and other related information such as the theme of the program, if desired, is selectively grabbed only at the users terminals that have already recorded or are scheduled to record that program. Specifically, the channels and times stored in memory at the user terminal are compared with the time and channel transmitted with each title. When a match occurs, the transmitted title is stored in memory. It may be used at the user terminal either together with the CDTL information or as a replacement for the channel and time stored therein. As a result, ultimately the title is stored with the location of each recorded program and other grabbed information in a tape directory in memory at the user terminals. When the user wishes to play a recorded program, the directory is displayed on the screen of a television monitor and the user marks the desired program with an on screen cursor. The VCR then transports the tape to the beginning of the desired program and the desired program is played.

For example:

At time T1, the user inputs a PlusCode (or other form of CDTL information) indicating which program to record; the equipment generates and stores the CDTL information.

At time T2, either before or after the recording of the desired program, a download session occurs in which all the program titles, channels, and times for a given time period are transmitted with the television signal to the users; the VCR of each user flags down only the titles (including other information such as theme related to the program) corresponding to the CDTL information stored at that user terminal, stores these titles in memory or replaces the corresponding CDTL information in the memory with the titles.

After T2, the titles will be utilized by the user for display of directories and selection of recorded programs at that user terminal.

FIG. 1 illustrates a user terminal. A cable feed or other television signal source such as an antenna or satellite dish is connected to a tuner 12, which is part of a cable box, television receiver, or satellite receiver. A switch 14*a* alternatively connects tuner 12 to a television monitor 16 for program viewing or to a VCR 18 for program recording. A switch 14*b* alternatively connects tuner 12 for viewing or VCR 18 for playback to monitor 16. Tuner 12, switch 14*a*, switch 14*b*, monitor 16, and VCR 18 are controlled by a microprocessor 20 having a memory 22 such as a RAM. Assuming analog transmission of the television signal, a VBI decoder 24 is connected between tuner 12 and switch 14*a* to extract program title information from the VBI of the television signal. (If the television signal is transmitted in digital form, no VBI decoder is needed.) This title information is coupled to microprocessor 20 for storage in memory 22. An input device 26 such as a remote controller is coupled to microprocessor 20 to enter user commands. As is well known, another tuner and appropriate switching could be provided to permit simultaneous television viewing and VCR recording. The Plus Codes, CDTL information, or instant recording command is entered into microprocessor 20 by input device 24. Microprocessor 20 stores the CDTL information, or channel and time, as the case may be, in memory 22 and, in cases (a) and (b), compares the time component with the output of the real time clock, which is internal to microprocessor 20. At the time of the program to be recorded, microprocessor 20 connects tuner 12 to VCR 18 through switch 14*a*, sets tuner 12 to the channel represented by the CDTL information in cases (a) and (b) or the selected channel in case (c), turns on VCR 18 for the duration of the program, and stores the tape location in memory 22 with the title or CDTL information, depending upon whether the title is grabbed before or after the recording. The title, channel, and time information for each time period, e.g., a 24-hour day, may be transmitted several times during the time period, and thus may arrive before or after the CDTL information or the instant record command is entered through input device 26. (In an alternative embodiment, the title, channel, and time information may be transmitted after the time period in which the programs are transmitted, and thus would always arrive after the CDTL information or the instant record command is entered through input device 26.) As the title, channel, and time information for each program is being transmitted in the television signal, it is extracted by VBI decoder 24. Microprocessor 20 compares the channel and time with the channel and time of the CDTL information stored in memory 22. If a match occurs, the title is grabbed and stored. The title is substituted for the CDTL information if the title is grabbed after recording. The title is stored in addition to the CDTL information if the title is grabbed before recording and then the CDTL information is discarded after recording. Otherwise the transmitted title, channel, and time information is discarded. Alternatively, the CDTL information could be stored for later use and display in either case.

Figure 2:
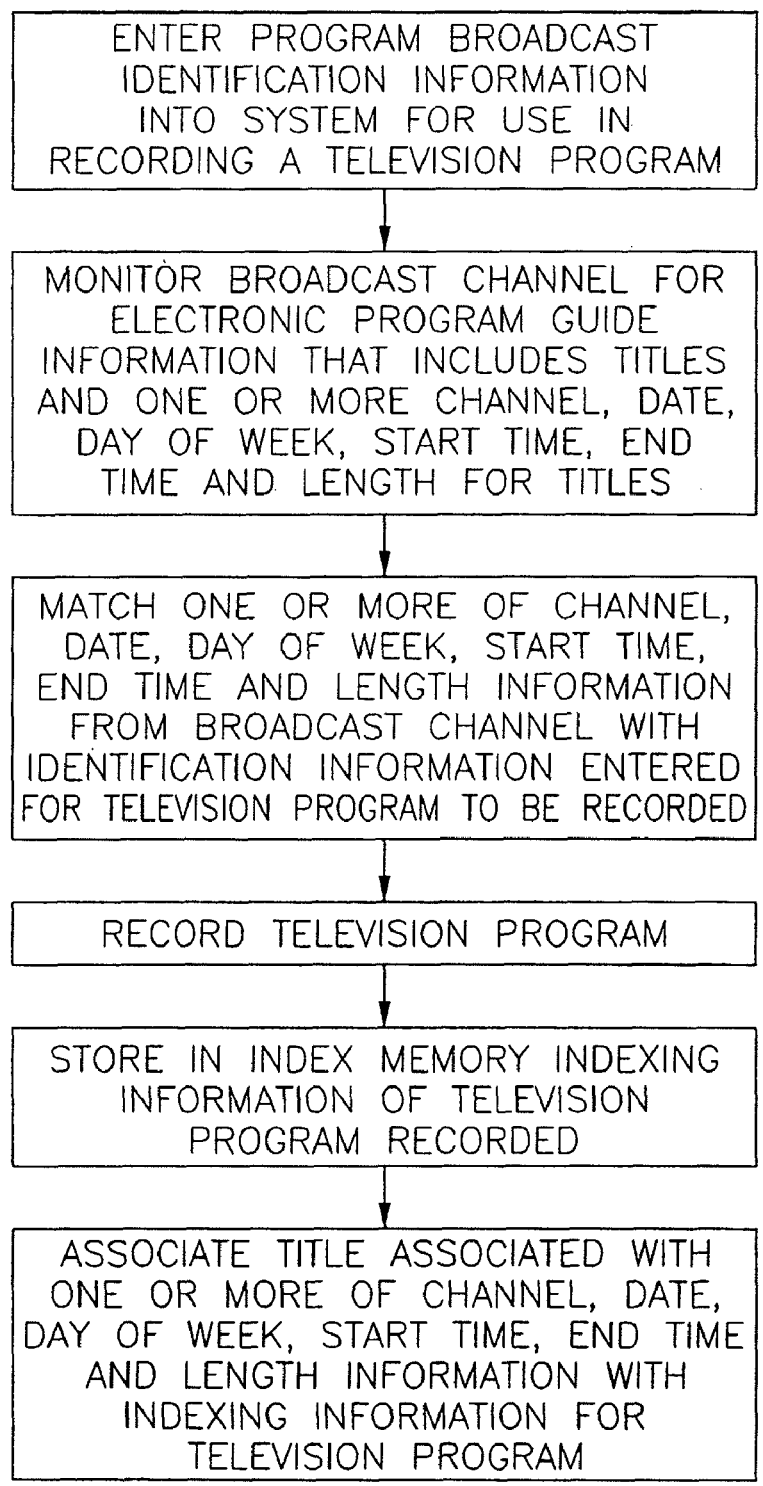
FIG. 2 illustrates in flow diagram form an example of the process in accordance with an embodiment of the present invention.

FIG. 2 illustrates in flow diagram form an example of the process in accordance with an embodiment of the present invention.

In summary, only the titles of the recorded programs or the programs to be recorded are selectively grabbed and stored, rather than all the programs telecast during a specified time period. In addition, only the CDTL information of the programs to be recorded is also stored. The result is a versatile tape management capability with a small storage requirement.

When the user wishes to play back a recorded program, VCR 18 is connected to monitor 16 through switch 14*b*. The user loads the corresponding tape cassette into VCR 18. Microprocessor 20 retrieves the program titles on the tape from memory 22 and feeds this information through VCR 18 to monitor 16 for display as a directory of the tape. When the user selects one of the titles from the on-screen directory, microprocessor 20 transports VCR 18 to the start of the selected program on the tape.

If the CDTL information is stored early enough, the transmitted program titles could be included in a conventional EPG data stream transmitted before the program is recorded and extracted therefrom for the described purpose. (Application Ser. No. 08/728,614, filed on Oct. 10, 1996 is incorporated by reference as if set forth in full herein for a description of how such a data stream is transmitted.) Otherwise, the titles are selectively grabbed from a customized data stream transmitted before and/or after the program is recorded.

In an alternative embodiment, the title information is received using a wireless receiver (not shown) such as a pager receiver.

The invention claimed is:

1. A method for selectively storing program data relating to programs a user selects to record, comprising:
receiving identifying information associated with at least one program that the user selects to record;
storing the received identifying information in a memory;
receiving program data transmitted from a remote location associated with a set of televised programs, wherein the stored identifying information is a subset of the received program data;
comparing the stored identifying information with the received program data; and
in response to determining that at least a portion of the stored identifying information matches a portion of the received program data associated with the at least one program that the user selects to record, storing the portion of the received program data, wherein the stored program data comprises information in addition to the stored identifying information associated with the at least one program.

2. The method of claim 1, further comprising recording the at least one program in response to determining that at least a portion of the stored identifying information matches a portion of the received program data associated with the at least one program that the user selects to record.

3. The method of claim 2, further comprising displaying on a display the stored program data associated with the at least one program after the at least one program is recorded.

4. The method of claim 1, wherein the stored identifying information comprises a channel and a time, and the received program data comprises at least the channel, the time, and at least one other form of program data.

5. The method of claim 4, wherein the at least one other form of program data comprises at least one of a title and a theme.

6. The method of claim 1, wherein comparing the stored identifying information with the received program data comprises comparing a time component of the stored identifying information with an output of a real time clock to determine when to provide a command to record the at least one program.

7. The method of claim 1, wherein the program data is received without a VBI decoder.

8. The method of claim 1, further comprising removing from the memory the at least one program's stored identifying information that matches the stored program data associated with the at least one program, after the program data is received.

9. A system for selectively storing program data relating to programs a user selects to record, comprising:
a memory;

a receiver configured to receive program data transmitted from a remote location associated with a set of televised programs; and a microprocessor in communication with the receiver and the memory, configured to receive and store in the memory identifying information associated with at least one program that the user selects to record, wherein the stored identifying information is a subset of the received program data, compare the stored identifying information with the received program data, determine that at least a portion of the stored identifying information matches a portion of the received program data associated with the at least one program that the user selects to record, and in response to the determination, store the portion of the received program data, wherein the stored program data comprises information in addition to the stored identifying information associated with the at least one program.

10. The system of claim 9, wherein the microprocessor is further configured to record the at least one program in response to determine that at least a portion of the stored identifying information matches a portion of the received program data associated with the at least one program that the user selects to record.

11. The system of claim 10, the microprocessor is further configured to enable a display to display the stored program data associated with the at least one program after the at least one program is recorded.

12. The system of claim 9, wherein the stored identifying information comprises a channel and a time, and the received program data comprises at least the channel, the time, and at least one other form of program data.

13. The system of claim 12, wherein the at least one other form of program data comprises at least one of a title and a theme.

14. The system of claim 9, wherein the microprocessor is configured to compare the stored identifying information with the received program data by comparing a time component of the stored identifying information with an output of a real time clock to determine when to provide a command to record the at least one program.

15. The system of claim 9, wherein the program data is received without a VBI decoder.

16. The system of claim 9, the microprocessor is further configured to remove from the memory the portion of the at least one program's stored identifying information that matches the stored program data associated with the at least one program, after the program data is received.

* * * * *